Aug. 26, 1924.
C. R. MABEE
1,506,023
APPARATUS FOR THE STEAM MILLING OF VEGETABLE SUBSTANCES
Filed Aug. 16, 1920
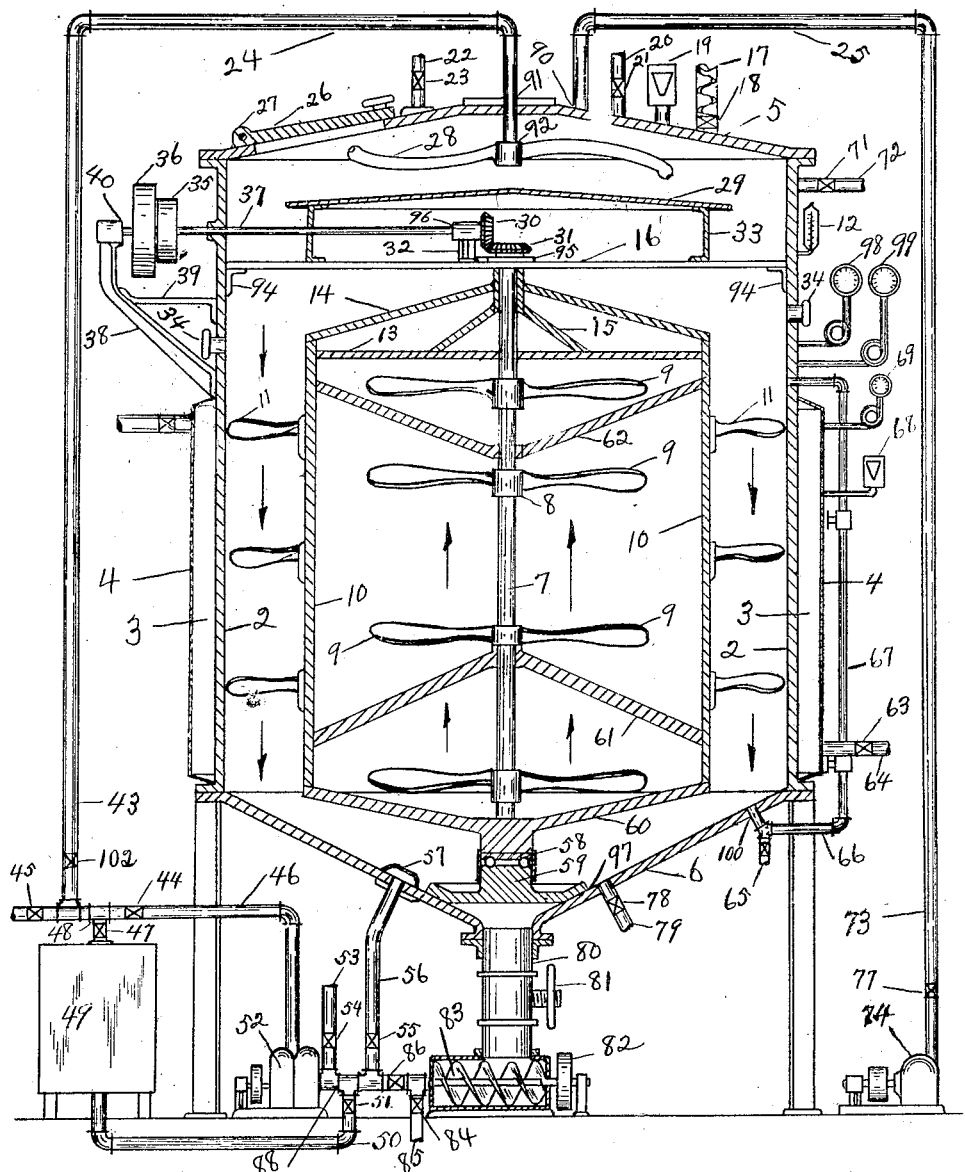
Inventor
Charles R Mabee
By
Attorneys Patented Aug. 26, 1924.

1,506,023

UNITED STATES PATENT OFFICE.

CHARLES R. MABEE, OF BUFFALO, NEW YORK.

APPARATUS FOR THE STEAM MILLING OF VEGETABLE SUBSTANCES.

Application filed August 16 1920. Serial No. 403,862.

*To all whom it may concern:*

Be it known that I, CHARLES R. MABEE, a citizen of the United States, residing at the city of Buffalo, in the county of Erie and State of New York, have invented certain new and useful Improvements in Apparatus for the Steam Milling of Vegetable Substances, of which the following is a specification.

This invention relates to heat and humidity regulating apparatus and the processes carried out thereby, which involve heating, cooking, mixing, compressing, endwise movement within a cylindrical container, breaking up and drying of vegetable substances, while subjecting them to constant movement through the center of a cylindrical container and constant movement in an opposite direction along the concave wall of the container, and while subjecting the materials treated to normal, increased and reduced pressure above and below that of the atmosphere. My invention has three objects in view, namely, 1. To extract soluble vegetable substances from insoluble vegetable substances, and dry the residue.

2. To render the fat, sugar and protein in vegetable substances substantially soluble in water without separating the fibrous and mineral matter therefrom.

3. To condense the nutrient values or soluble portions of vegetable substances by removing a portion or all of the insoluble or fibrous and mineral constituents from the soluble portions therein, and thereafter adding the soluble or nutrient portions thereof to other vegetable substances of like or similar character, and thereafter cooking and drying the mass.

The drawing made a portion of this specification shows apparatus adapted to carry out my process but various changes may be made as to details whereby the same results may be accomplished without deviating from the invention.

In the accompanying drawing,

Fig. 1 is a cross section, with parts shown in conventional form.

Referring to the accompanying drawing, 1 is a cylindrical container closed at its upper end by the plate 5 and at its lower end by the plate 6. The wall of the cylinder is shown at 2, surrounded at its central and lower portions by the steam jacket 3 the outer wall of which is shown at 4.

The jacket is provided with a steam inlet connection shown at 42 provided with the regulating valve shown at 41, and also with the steam condensation outlet pipe shown at 64 provided with the regulating valve shown at 63.

The upper end plate shown at 5, is provided with a manhole shown at 26, hinged at 27 to the end plate 5, also with the air vent pipe 22 provided with the regulating valve 23, also with the vacuum pump pipe 73, connected with the vacuum pump 74, and which pipe 73 passes through the end plate 5 at 90.

In the upper end plate 5 and positioned centrally therethrough at 91, is a suitable opening for the passage of the pipe 43 connected by means of the pipe 46 with the pump shown at 52. The lower end of the pipe connection 43, extends downward into the upper extremity of the cylindrical container 1 and at its lower extremity within the container is connected with the swivel joint shown at 92 which is so arranged that when liquid passes through the pipe 43 under suitable pressure the curved pipe shown at 28 attached to the swivel joint 92 is set in rotary motion. The outer extremities of the curved pipes shown at 28 is provided with an outlet opening for the liquid passing through the pipe 43, and the general effect of the operation due to the swivel joint 92, the curved pipes 28 and the openings 93, is to spread the liquid over and against the concave wall of the container shown at 2.

The upper end plate 5 is also provided with the pipe connection shown at 20, provided with the regulating valve shown at 21, which is connected with suitable water supply or other liquid containing tanks, also with the safety valve shown at 19, and with an intake connection shown at 17, provided with the regulating valve 18. The intake connection 17 is provided with screw conveyor means for introducing ground shredded or finely subdivided vegetable materials at a uniform speed into the container 1.

Positioned centrally through the upper end of the container 1 is the cross support 16 attached to the walls of the container by the brackets shown at 94. Extending upward from and attached to the cross support 16 are the arms 33 which support the directing plate 29, which prevents materials entering the container through the upper end plate 5 from passing down centrally through the container 1. Attached centrally of the cross support 16 is the plate shown at 95 which supports the gear wheel 31, connected with the gear wheel 30 attached to the inner end of the shaft 37, which shaft passes through the wall of the container and is supported centrally therein by the bearing 96, and at its opposite extremity by the bearing 40 supported by the brace 38 attached at its lower extremity to the convex surface of the wall 2. The shaft 37 is provided with the pulleys 35 and 36 positioned externally of the container.

Passing centrally through the central and lower portions of the container is the shaft 7, supported by the bearing 58, resting upon the plate 59 attached to the lower end plate 6 at 97. Firmly affixed to the shaft 7 by the casting rings 8 are the blades 9 adapted upon rotation to lift the materials centrally and upward through the container. Also firmly attached to the central shaft 7 are the braces 13, 14, 60, 61 and 62 which hold in position the arms 10 to which are firmly attached the plates 11 which upon rotation of the shaft direct the movement of materials within the container in a downward direction.

The wall 2 of the container 1 is provided with two peep holes on opposite sides shown at 34, just above the steam jacket, and with the thermometer shown at 12, also with the vacuum gauge shown at 98 and the steam gauge shown at 99. The steam jacket is provided with the safety valve 68, and the steam gauge 69.

Passing through the lower end plate 6, at 100, is the pipe 66 to which is attached the glass tube 67 for enabling the operative to determine the height of the liquid content of the container 1. The pipe 66 is connected with the pipe 65 which provides means for clearing the pipe 66 of portions of the shredded materials which may pass in thereto.

The lower end plate 6 is also provided with the pipe connection 79 provided with the regulating valve 78, which may be used for the introduction or withdrawal of either steam or liquid materials. The lower end plate 6 is also provided with the pipe connection 56 provided with the regulating valve 55 and connected with the pipe connection 88 passing between the pump 52 and the outlet end of the screw conveyor shown at 83. Connected with the pipe 88 is the connection 53 provided with the valve 54, and the pipe connection 85 provided with the regulating valve 84, and in the pipe 88 is the valve 86. The pipe 88 is also connected with the pipe 50 provided with the valve 51, which at its other extremity is connected with the tank 49. The pipe connection 46 leads from the pump 52 to the pipe 43, and is connected with the tank 49 by the pipe 48 provided with the regulating valve 47.

The pipe 46 is provided with the valves 44 and 45 and liquid passing therethrough may be directed either into the tank 49 or into the upper portion of the container, or other suitable storage through the regulation of the valves, 44, 45 and 47.

Firmly attached centrally of the lower end plate 6 is the outlet pipe 80 provided with the regulating valve 81, and the lower extremity of the pipe 80 is firmly attached to the screw conveyor means shown at 83 provided with the pulley 82.

When all valves have been properly adjusted, and the mechanisms set in proper motion to accomplish the first object of this invention, namely, to extract soluble vegetable substances from insoluble vegetable substances, the materials to be treated are introduced through the upper end plate 5 to which is attached the conveyor pipe 17 with conveyor mechanism therein to establish uniform feed. When the container has been filled the valve 18 in the intake pipe 17 is closed and steam is introduced into the jacket 3 by the opening of the valve 41 in the pipe 42. The condensation outlet pipe 64 is attached to a steam trap and provision is made by the safety valve 68 to regulate the pressure in the jacket as may be desired.

In certain instances steam may be introduced into the container 1 by opening the valve 78 in the pipe 79 which may be suitably connected with steam supply. Liquid materials, either water or vegetable juices, are introduced into the container at its upper end through the pipe 43 and its swivel connections as shown at 28, 92 and 93.

The travel of the liquid materials through the container during the period of treatment is as follows,—leaving the opening 93 at the outer extremity of the curved pipe connection 28, they are spread by centrifugal motion upon the concave surface of the wall 2 of the container and descend along the wall by gravity over that portion of the wall heated by the jacket 3 which vaporizes liquid constituents and sets up an internal pressure within the container which cooks the materials introduced therein. The liquid passes out of the lower portion of the container through the strainer shown at 57, and through the pipe 56 into the pump 52, where it is forced through the pipe 46 into and through the pipe 43 back into the curved pipe 28 from which it started. The tank 49 is a reservoir for juices with which to commence the operation of moistening and steaming the materials to be treated.

The travel of the materials to be treated is regulated by the speed of the shaft 7.

The materials move spirally downward on and about the concave surface of the container, and upward centrally therethrough as shown by the arrows affixed to the accompanying drawing. By this movement the materials continually change their position and maintain standard humidity which is essential to any process of cooking where the materials treated are not submerged in liquid materials.

When the materials have been treated sufficiently to render the nutrient portions thereof soluble in water, the valve 102 in the pipe 43 is closed, and the liquid substances used in treating the materials, are either pumped into the tank 49, or into other receiving tanks by the opening of the valve 45 in pipe 46. The pipe 53 is connected with suitable water supply, and the valve 54 therein is then opened and water is introduced into the container by the operation of the pump 52, and which absorbs in solution the soluble portions of the vegetable substances within the container, after which the solution is pumped into one of the receiving tanks, and water is again introduced to rinse and absorb such remaining soluble portions as may then be present, and deposited in a receiving tank, all valves connected with the container are closed the valve 77 in pipe 73 is opened, and the vacuum pump set in operation. I usually open the valve 23 in air vent pipe 22 for a few minutes after the liquid materials have been removed from the container, in order to permit vapor of evaporation to escape before starting to dry the residue, which consists chiefly of fiber, by use of reduced atmospheric pressure.

When the fiber is substantially dry I open the valve 81 in pipe 80, and the valve 84 in pipe 85, close valve 86 in pipe 88 and apply power to the screw conveyor 83 by the pulley 82, which empties the container of the fiber which passes out through the pipe 80, the conveyor 83, the pipe 88 and the pipe 85. The valve 81 in pipe 80 and the valve 86 in pipe 88, are then closed, and all other valves are properly adjusted, and the operation is repeated.

To accomplish the second object of the invention, to render the fat, sugar and protein substantially soluble in water without separating the fibrous and mineral matter therefrom, the internal moving parts are set in operation through the application of power to the shaft 37, the valve 18 in intake pipe 17 is opened, and the container filled with shredded vegetable material, after which the valve 18 is closed. Steam is then introduced into the jacket, and sufficient water is introduced through the pipe 72 guarded by the valve 71, to supply when expanded into vapor sufficient moisture with which to steam cook the materials, and permit a small amount of water to saturate the materials during the cooking period.

When the cooking period has been completed the valve 23 in the air vent pipe 22 is opened, and the vapor of evaporation is permitted to escape therefrom for a period of about five or ten minutes, after which the valve 23 is closed and the vacuum pump 74 is set in operation to facilitate drying by means of a commercial vacuum. During the drying period, as well as the cooking period, all valves are closed except as stated. The result of this operation is that the fat, sugar and protein are released to a substantial extent from the fibrous materials in which they are held, and the vegetable substances have been cooked and dried, after which they are removed from the container in the manner described in the instance of the accomplishment of the first object of the invention, wherein the fiber is removed after the soluble portions have been removed therefrom.

In accomplishing the third object of my invention, the condensing of the nutrient portions of vegetable substances by removing a portion or all of the insoluble or fibrous and mineral constituents from the soluble portions therein, and thereafter adding nutrient portions thereof to other vegetable substances, the method of procedure is as described in the first object of my invention wherein soluble vegetable substances are extracted from insoluble vegetable substances, and as described in the second object of my invention by the use of the extracted soluble substances in semi-liquid form being mixed with the shredded vegetable materials to provide vapor or steam upon the application of heat, with which to cook the materials, after which they are dried by permitting vapor of evaporation to escape through the air vent pipe 22, and thereafter subjected to the influence of a partial vacuum, and removed from the container in the manner that the dried materials are removed therefrom in the first two instances.

The action of the blades 9 which elevate the materials through the center of the container, and the blades 11 which direct the materials downward about the concave surface of the container, in addition to the movements as stated, is to constantly and intermittently compress the materials with which they come in contact, which shortens the duration of the operation of cooking the materials to render the nutrient values substantially soluble in water.

By the application of power applied to the shaft 37 by the pulley 36, I rotate the internal moving parts from 12 to 20 times per minute during the cooking period, and by the application of power to the pulley 35 attached to the shaft 37, I rotate the internal moving parts from 18 to 30 times per minute during the drying period, and find that this increased speed of rotation materially shortens the period of drying.

The directing plate 29 prevents the materials from coming in contact with the gear wheels which is a desirable construction feature. One of the main features of the invention is the constant motion of the materials treated circumferentially and spirally over the concave heated walls of the container. Another important feature is the depositing of the liquid materials upon the concave surface, through the use of the swivel, and allowing them to pass over the heat transmitting surface represented by the interior wall of the steam jacket, which effects more rapid generation of steam than if the liquid materials were deposited equally throughout the substances treated, and during the period when the vapor of evaporation is permitted to escape through the air vent pipe 22, the motion of the materials over the concave heated treating surface accelerates vaporization and drying, and when a partial vacuum is employed within the container during the drying period, this motion of the materials over the treating surface with the constant mixing of the materials facilitates drying to a great degree by maintaining the materials in a substantially uniform condition as to humidity.

Another important feature of the invention is the constant washing of the materials treated by the introduction of liquid materials at one end of the container, and their withdrawal from the opposite end of the container, and the washing of the residue after soluble portions thereof have been removed in solution. The motion of the internal moving parts together with the screw conveyor furnish mechanical means for removing the materials when dry from the container.

I utilize steam within the jacket at from 10 to 60 pounds pressure, and maintain a pressure within the cylindrical container of from 10 pounds upward as high as 100 pounds internal pressure.

I employ a vacuum of from 10 to 25 inches, and find that the action of this vacuum combined with the application of heat from the steam jacket and the constant motion of the materials effects drying very rapidly.

It is obvious that the amount of liquid materials placed in circuitous motion in and out of the ends of the container, and also the amount maintained within the container, may be regulated in accordance with the nature of the materials treated, and that various forms of equipment may be utilized to obtain the same effects in the various operations. The time limit of operation is a material factor in the success of the process, and by utilizing the smallest possible amount of humidity to obtain the desired results, shortens the time of operation, reduces the cost of vaporization and drying, reducing the cost of operation and increasing the capacity of the apparatus.

It is obvious that the third object of my invention, the condensing of nutrient values may be accomplished by combining condensed juices from one product with vegetable substances of a different nature. I utilize the wash water from the second and third operations of circulating liquid substances through the container over the materials treated, to furnish liquid substances for the first operation on materials when first introduced into the container.

The liquid materials passing downward spirally and circumferentially are substantially in layer formation over the heat transmitting surface while the central zone within the container is filled with materials to be cooked by the use of steam, which, as far as I have been able to ascertain, has not been accomplished by any means.

What I claim is—

1. An apparatus for treating vegetable materials, comprising a closed cylindrical container, a conveyor centrally located therein and comprising a central shaft upon which are mounted casting rings and blades adapted to exert a lifting action upon rotation, and braces and arms which carry a plurality of plates adapted to direct the material downward upon rotation, positive feeding means for introducing said materials into said container, and means for spraying liquid materials upon said vegetable materials within said container.

2. An appartus for treating vegetable materials, comprising a closed cylindrical container, a conveyor centrally located therein and comprising a central shaft upon which are mounted casting rings and blades adapted to exert a lifting action upon rotation, and braces and arms which carry a plurality of plates adapted to direct the material downward upon rotation, positive feeding means for introducing said materials into said container, and means rotatably mounted for spraying liquid materials upon said vegetable materials within said container.

3. An apparatus for treating vegetable materials, comprising a closed cylindrical container, a conveyor centrally located therein and comprising a central shaft upon which are mounted casting rings and blades adapted to exert a lifting action upon rotation, and braces and arms which carry a plurality of plates adapted to direct the material downward upon rotation, positive feeding means for introducing said materials into said container, means for spraying liquid materials upon said vegetable materials within said container, and means for positively removing said vegetable materials from said container.

4. An apparatus for treating vegetable materials, comprising a closed cylindrical container, a conveyor centrally located therein and comprising a central shaft upon which are mounted casting rings and blades adapted to exert a lifting action upon rotation, and braces and arms which carry a plurality of plates adapted to direct the material downward upon rotation, positive feeding means for introducing said materials into said container, means for spraying liquid materials upon said vegetable materials within said container, and means for withdrawing liquid materials from said container and for returning the same thereto.

5. An apparatus for treating vegetable materials, comprising a closed cylindrical container, a conveyor centrally located therein and comprising a central shaft upon which are mounted casting rings and blades adapted to exert a lifting action upon rotation, and braces and arms which carry a plurality of plates adapted to direct the material downward upon rotation, positive feeding means for introducing said materials into said container, means for spraying liquid materials upon said vegetable materials within said container, means for positively removing said vegetable materials from said container, and means for withdrawing liquid materials from said container and for returning the same thereto.

CHARLES R. MABEE.